(No Model.)

N. H. BORGFELDT.
TIME SIGNAL.

No. 406,989. Patented July 16, 1889.

WITNESSES:
Gustave Dieterich.
John M. Speer.

INVENTOR
Nicholas H. Borgfeldt
BY Briesen, Steele & Knauth
ATTORNEYS

UNITED STATES PATENT OFFICE.

NICHOLAS H. BORGFELDT, OF BROOKLYN, NEW YORK.

TIME-SIGNAL.

SPECIFICATION forming part of Letters Patent No. 406,989, dated July 16, 1889.

Application filed November 19, 1888. Serial No. 291,203. (No model.)

*To all whom it may concern:*

Be it known that I, NICHOLAS H. BORGFELDT, of the city of Brooklyn, county of Kings, and State of New York, have invented an Improved Fog-Signal Indicator for Vessels, of which the following is a specification, reference being had to the accompanying drawings, in which—

Figure 1:
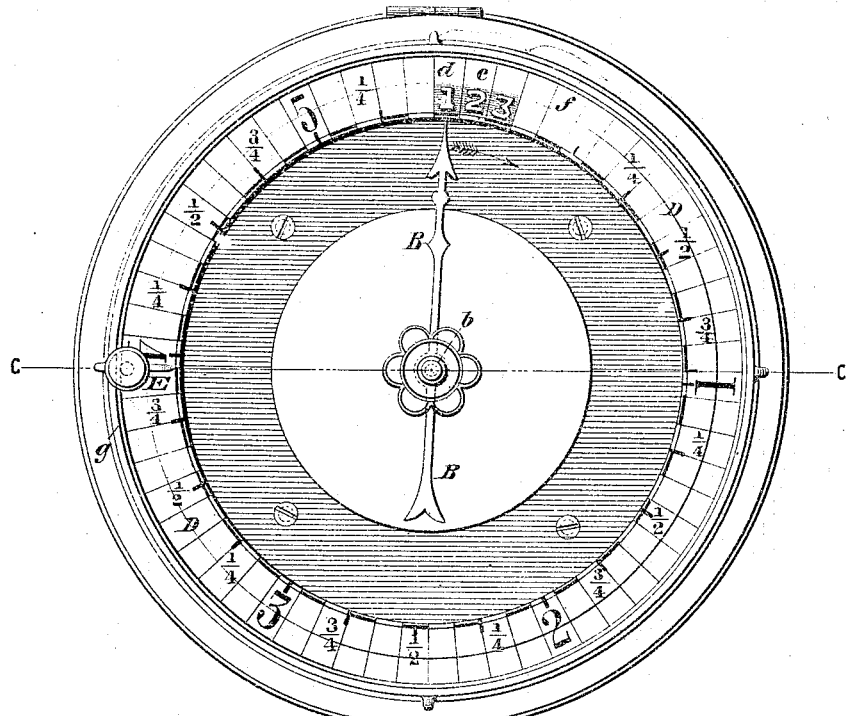
Figure 2:
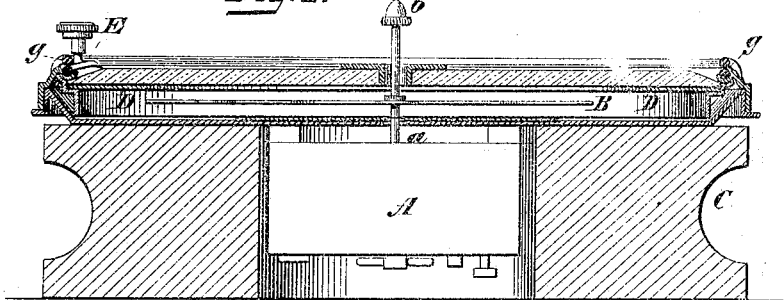

Figure 1 is a plan view, and Fig. 2 a vertical section, on the line $c\,c$, Fig. 1, of my improved fog-signal indicator.

The object of this invention is to enable the masters of steam and other vessels on the high seas and other water-ways to ascertain definitely the direction in which other vessels hidden by fog are moving with respect to the motion of their own craft and the distance between the vessels. It is exceedingly difficult, by the mere sense of hearing, to know from what direction a sound emanates. The master of a vessel in a fog, hearing the signal of another vessel, cannot definitely know whether that other vessel approaches him or recedes from him from either the port or starboard side. By my invention this difficulty is sought to be overcome; and it consists principally in a clock having a movable hand and having a dial which is divided in a particular manner, hereinafter described, so as to indicate distance instead of merely indicating time—that is to say, it indicates distance by reckoning the time consumed for the sound to travel.

The invention consists in the arrangement of the clock-dial and its appurtenances, as hereinafter more fully described.

In the drawings, the letter A represents a clock-work, of ordinary or suitable construction, adapted to revolve an arbor $a$ once around its axis in, say, one minute or other subdivision of time. On this arbor is frictionally held a hand or pointer B, which, when the clock-work is in action, revolves with the arbor once in every minute or other subdivision of time. The hand B can, however, be turned freely on the arbor $a$, to which it is frictionally united in suitable manner, and for the purpose of turning it conveniently by hand it is provided with a handle $b$, as shown.

The frame C of the clock-work carries a dial D, which is divided from its zero-point $d$, in peculiar manner—viz., starting from the zero-point in the direction of the arrow shown in Fig. 1, which is the direction in which the hand or pointer B is moved by the clock-work, the dial first shows a section $e$, which in the drawings is marked with the numerals 1 2 3, and is of a length which corresponds with the motion of the hand B during the time consumed by the giving of a signal on board the vessel that carries this clock. The next section of the dial $f$, adjoining the section $e$, is as long as the section $e$, and corresponds with the motion of the hand B during the time consumed by the giving of a signal by the distant vessel. From the end of the section $f$ to the zero-point $d$, regarding the dial in the direction of the arrow, said dial is divided into spaces indicating twice the distance traveled by sound—that is to say, sound traveling, as has been ascertained, eleven hundred and twenty feet per second, or a little more than a mile of five thousand two hundred and eighty feet in five seconds—the dial is divided at double that rate into sections indicating miles and parts thereof. Thus the marks "$\frac{1}{4}$," "$\frac{1}{2}$," "$\frac{3}{4}$," "1," "2," "3," "4," "5," &c., on the dial indicate double the distance in miles traveled by sound during the period of time consumed by the pointer B in traveling from one of said marks to the other. In other words, the pointer B will travel from the end of the section $f$ to the mark "$\frac{1}{4}$" in a space of time equal to that consumed by sound in traveling twice one-quarter of a mile, &c. Adjoining the dial there is a movable index-hand E, placed on a rail $g$ for convenient adjustment, so that said index-hand E may be set over any desired part of the dial.

This being the construction of the clock, its operation is as follows: Supposing the vessel having this clock to be in a fog, and supposing the instructions to all vessels in a fog to be that immediately upon one hearing the signal of another he shall respond by a certain number of blasts—say three—now, if the captain of the vessel having this clock hears the signal of another vessel, he is expected to immediately turn the hand B to zero and then to give his three blasts. During the giving of these three blasts the hand B by the clock-work will be moved along the section e of the dial. By the time the responding signal of the distant vessel is heard the pointer B will have traversed the section f of the dial plus so much of the dial as corresponds to the time consumed by sound in traveling double the distance between the two vessels. Thus, if the vessels are one-quarter of a mile apart, and if the signal is given by the one vessel while the hand B passes the section e of the dial, the captain of such vessel will hear the opposite signal after the sound of his own signal has traveled to the distant vessel. The distant vessel having given its signal in reply, (which consumes time corresponding to the length of the section f of the dial,) after finally the sound of the last-mentioned signal has reached the first vessel, by that time the pointer B will be opposite the mark "¼" of the dial, indicating, therefore, that the vessels are one-quarter of a mile apart from one another. Immediately upon hearing the return-signal the captain of the first vessel again puts the hand of his clock to zero, again gives a reply-signal, and will know when he receives the return-signal whether the vessels are now nearer to one another than before or farther apart. In order to facilitate these observations, the movable index-hand E can be used to advantage, it being placed by the captain in line with the position of the pointer B occupied by the same at the time the distant signal was last heard.

Regulations connected with the use of this clock could be readily arranged so that the captains when ascertaining that the vessels approach one another, and when they find that they are, say, one mile apart from one another only, shall both stop, with liberty to exchange such signals as will permit the one or the other of these vessels to proceed without risk of collision. In fact, the word "Stop" may be put on the one-mile mark of the dial, the words "Half-Speed" on the one, and a half-mile mark, &c. I am satisfied that by an intelligent use of this clock collisions of sailing-vessels, and of steam-vessels especially, can be readily avoided.

What I claim, and desire to secure by Letters Patent, is—

1. A clock having a pointer B, and means for automatically moving the same, and a dial D, divided into sections indicating lineal measurement at the rate of double the distance traveled by sound during the motion of the pointer B.

2. In a clock having a pointer B, and means for automatically moving the same, the dial D, having independent sections e f, and having its remaining portion divided into sections indicative of double the distance traveled by sound during the motion of the pointer B, substantially as described.

3. In a clock having a pointer B, and means for automatically moving the same, the dial D, having independent sections e f, and having its remaining portion divided into sections indicative of double the distance traveled by sound during the motion of the pointer B, in combination with the movable index-hand E, substantially as described.

NICHOLAS H. BORGFELDT.

Witnesses:
CHARLES L. RUSSELL,
HARRY M. TURK.